United States Patent [19]

Oksala

[11] Patent Number: 5,124,541
[45] Date of Patent: Jun. 23, 1992

[54] FORM AND PROCEDURE FOR SELECTING A CODE TO BE KEPT SECRET

[75] Inventor: Pekka A. Oksala, Helsinki, Finland

[73] Assignee: Maksutekniikka Oy, Helsinki, Finland

[21] Appl. No.: 659,834

[22] Filed: Feb. 22, 1991

[51] Int. Cl.$^5$ ............................................. G06K 19/06
[52] U.S. Cl. ................................. 235/494; 235/487; 235/495
[58] Field of Search ............... 235/380, 487, 494, 495; 283/75, 11

[56] References Cited

U.S. PATENT DOCUMENTS

| | | | |
|---|---|---|---|
| 4,184,148 | 1/1980 | Smagala-Romanoff | 283/11 |
| 4,445,712 | 5/1984 | Smagla-Romanoff | 235/494 |
| 4,885,459 | 12/1989 | Norsworthy | 235/494 |

*Primary Examiner*—Harold Pitts
*Attorney, Agent, or Firm*—Wolf, Greenfield & Sacks

[57] ABSTRACT

The invention concerns a method and apparatus for selecting a code that has to be kept secret. The apparatus comprises a form having two separable parts, a symbol part and a selection part. The symbol part comprises a symbol area consisting of at least one symbol field made up of a plurality of symbols. Typically, there is a symbol field for each character or other symbol of the code to be selected. The selection part comprises a selection area corresponding to the symbol area, this selection area having a selection field corresponding to each symbol field. The selected symbols may be entered in clear text in the symbol fields, and an encoded version of the symbol is obtained by making an entry in the corresponding selection field position. The symbol part and the selection part each have the same identifier field, the symbols corresponding to the entries in the selection area being identifiable with the aid of the identifier in the identifier field.

10 Claims, 1 Drawing Sheet

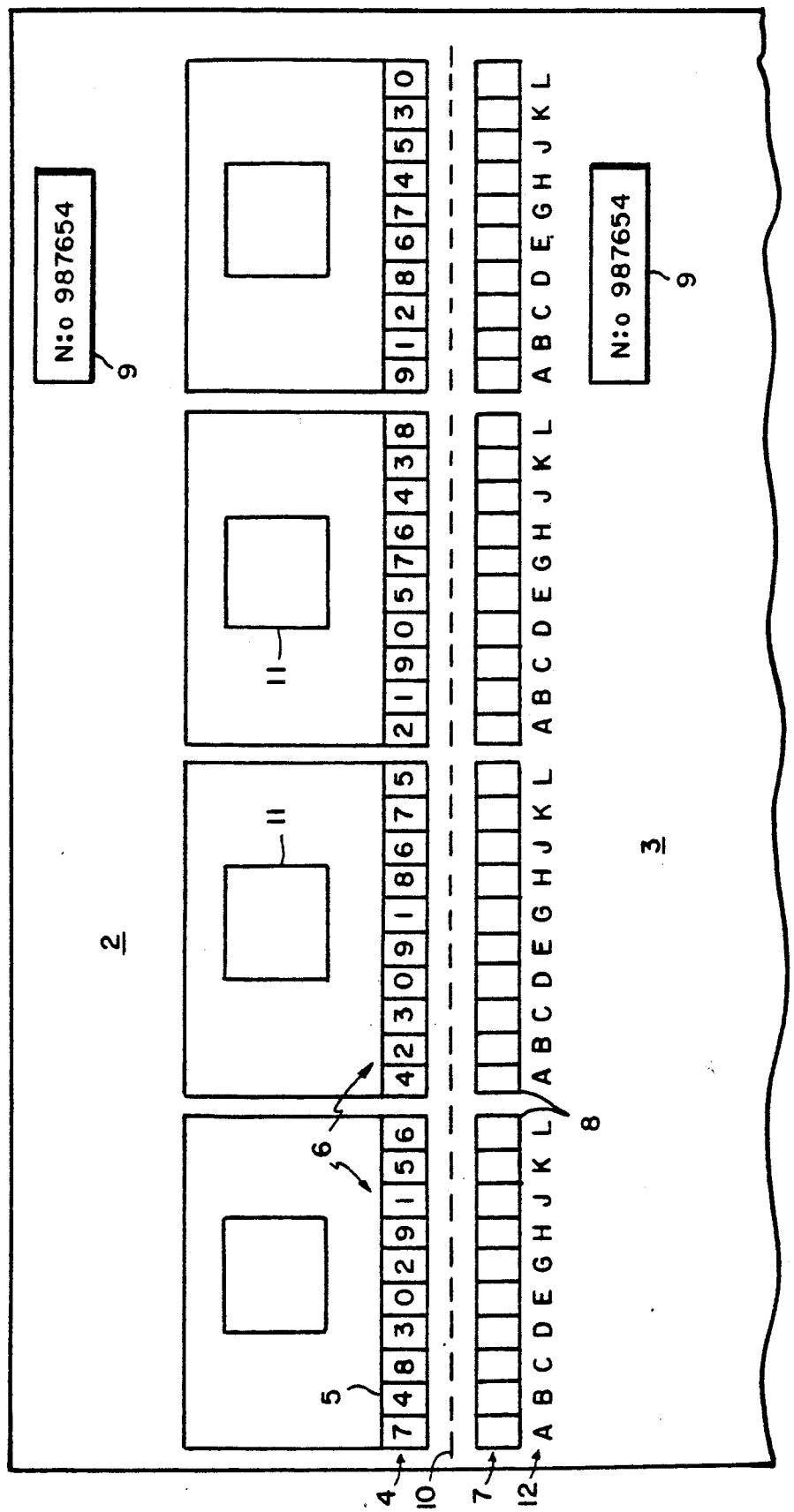

FORM AND PROCEDURE FOR SELECTING A CODE TO BE KEPT SECRET

FIELD OF THE INVENTION

The present invention concerns a form and a procedure for selecting a code which is to be kept secret, with the aid of a form to be completed, which is individually prepared and suitable encoded in an EDP installation.

BACKGROUND OF THE INVENTION

The use of various kinds of payment cards such as credit, bank and ATM cards in various electronic payment terminals and automata is increasingly based on identifying the cardholder with the aid of a secret identification number (PIN, Personal Identification Number). This PIN is kept secret, known to the cardholder alone; it cannot for ease of remembering be written on the card nor kept in clear text form in conjunction with the card.

PIN systems of current payment cards are usually based on a solution in which the PIN is created by calculation from card number, using an algorithm which is controlled by a secret key. As a result, the cardholder has not heretofore had any chance to influence the selection of PIN for his card. This implies that a customer holding a number of payment cards has to memorize a number of different PINs; this is an inconvenience in using the cards and adds to the chances of error.

In order to make the memorizing of PINs easier, designs have been worked out which enable the customer to select his PIN, may be divided into two main classes, depending on whether or not the PIN-validation procedure involves data which is dependent on the PIN and is recorded on the card. Off-line-based validation procedures usually involve the recording on the card of data (PVV, PIN verification Value) calculated from the PIN. Therefore, the customer should already select his PIN at the card ordering stage because it has an effect on the data contents which have to be recorded on the card. In on-line systems, the PIN can be validated using a file maintained in the central system and, therefore, the selection of a PIN is not necessary before the card producing stage.

Commonest at the moment are those PIN validation procedures in which a PVV encoded on the magnetic stripe of the card is employed. In such card systems, implementation of a customer-selected PIN is problematic, primarily because the selected PIN should, in connection with application to the card, be conveyed to the card issuer s data system under such secrecy that it cannot at any stage in connection with processing the card application be read in clear text form.

· One solution that has been in use heretofore is based on a selection form, mailed to the customer after his returning the card application, on which the customer writes the PIN which he selects, without this form revealing the sender s personal data in clear text. The system identifies the sender by a reference number that has been printed on the form by the issuer. The drawbacks of this method are high postage costs and extra work, delays and costs from processing the separate form parts.

Another solution in present use is based on a concealing form resembling a scrape to-reveal lottery ticket by which the person ordering a card is enabled to convert the PIN he selects into encrypted form and to send it in together with the order form. The drawbacks of this procedure are the costs due to printing and security technology associated with the concealing form, and possibilities of error inherent in the interpretation of manually written manuals.

SUMMARY OF THE INVENTION

The object of this invention is to eliminate the drawbacks mentioned. The specific object has been to develop a form, and a corresponding procedure, in which the selected PIN or other code can be entered on the same form by which the card is ordered, whereby one avoids sending the information concerning the PIN by separate postage;

the selected PIN can be entered using the ticking principle, in order to reduce the errors in interpreting numbers or other symbols;

concealment of the PIN can be made to be based on individual numbering of each form; this precludes the possibility of finding out the selected PIN even if the returned part of the form should fall into unauthorized hands;

the person filling the card application form can keep one part of the form showing the selected PIN in clear text.

Regarding the features which characterize the invention, reference is made to the claims section.

The form of the invention consists of two separable parts: the symbol part and the selection part. Between these parts advantageously belongs a dividing area, such as e.g. a perforation or any other similar structure by the aid of which the parts of the form can be separated from each other. The symbol part of the form comprises a symbol area, consisting of at least one symbol field comprising a plurality of different symbols. The symbols used are advantageously numerals, but letters and other characters may equally be contemplated. The selection part of the form comprises a selection area corresponding to the symbol area, the symbols selected from the corresponding symbol fields being entered in this selection area in non-clear text, disguised form , e.g. according to a tick square principle, the selection part further comprises an identifier field, the identifier provided therein enabling the symbols corresponding to the entries in the selection area to be identified.

Advantageously, the form comprises symbol fields, and selection fields corresponding to them, in equal number as there are characters, e.g. numerals, in the code to be kept secret which is being selected. The symbol field and the corresponding selection field are advantageously similar in configuration, for instance the symbol field consisting of a row of numerals and the corresponding selection field being a row of empty squares equal in length and size. It is equally possible that the fields have another shape, e.g. that of three by three or four by four sets of squares.

The identifier field in the selection part contains the individual identifier of each particular form, e.g. the form number, which identifies each form individually. This form number advantageously also appears as a printout on the symbol part.

The symbol part of the form advantageously also comprises a code field in which the code selected in the symbol area can be entered in clear text, because the symbol part is meant to be detached from the selection part after completing the form and thus the symbol part is left with the person completing the form, as a cleartext document showing the code that was selected.

In a preferred embodiment of the invention, the selection part comprises identifying fields corresponding to the selection fields, by the aid of which the squares of the selection field can be identified and, thereby, the entries made in the selection fields can be identified.

It is also possible that the symbol part comprises identifying the fields corresponding to the symbol fields, the selected code being entered in the selection part with the aid of the codings, i.e. characters, in the identifying fields. In this case, however, the entry in the selection part is made with different characters, letters or numerals, not by the tick-square method, whereby errors in interpretation may be incurred.

In a particular embodiment of the invention, at least the symbol area of the form, and possibly also the identifying fields, is/are covered in new, unused forms. The covering has been done in such a way that the cover can be removed when filling in the form. Thus, the covering may, for instance, consist of a coating removable by scraping, or of double folding the form with sealing at the edges. The purpose with such covering is to prevent unused forms from being copied, a copy of the form enabling somebody to determine the code selected in the respective selection part.

In the procedure of the invention for selecting a code to be kept secret, an individually prepared form is utilized that has been suitably encoded in an EDP installation. The form consists of two separable parts, a symbol part and a selection part. In the symbol fields belonging to the symbol part, the elements of the desired code are selected. The selected elements are marked according to the tick-square principle in the corresponding selection fields of the selection part, whereby, with the aid of the characters in the identifying fields corresponding to the selection fields and of the identifier in the identifier field of the selection part, the code that has been selected is identifiable and can be introduced in service. In order that no unauthorized person might be able to identify the selected code from the selection part of the form, the code elements produced as a printout in the symbol field have to be in different, random and/or suitably permuted order in different forms.

In the following, the invention is described in detail, referring to the attached drawing, wherein is presented part of a form according to the invention.

IN THE DRAWINGS

The drawing is a plane view of the upper part of a form according to a preferred embodiment of the invention.

DETAILED DESCRIPTION

Only the upper part of a form is shown in the figure since this is the inventive part thereof, the remainder of the form consisting of a part or parts to be suitably filled in and which are known in the art and adapted to each particular application. The form 1 of the drawing comprises a symbol part 2 and a selection part 3, these being separated by a perforation serving as dividing area 10, the parts being separable by tearing at the perforation.

The symbol part 2 comprises a symbol area 4, consisting in the present embodiment of four symbol fields 6, whereby the code to be selected will contain four different symbols 5. The selection part 3 comprises a selection area 7 corresponding to the symbol area 4 and consisting of selection fields 8 corresponding to the symbol fields 6. The selection fields are empty sets of squares substantially like the symbol fields in shape, and the squares of these empty sets of squares have been individually identified with the characters, i.e. letters, found in the identifying fields 12. The form, moreover, includes both in the symbol part 2 and in the selection part 3 an identifier field 9, the number, i.e. the form number, enabling each form that is used to be individually identified. Likewise in this embodiment of the form, its symbol part 2 comprises a code field 11 consisting of four squares, with each code field or square corresponding to one symbol field 6. It is thus possible to enter in these squares in clear text the selected code.

The form of the invention is used as follows: In each symbol field 6, one number is selected and entered in clear text in the corresponding code field 11. Next, a mark is made at the selected number in the corresponding selection field 7, for instance a tick in the square. As an example: if in the first symbol field the number "9" has been selected, a tick is made in that square in the selection area which is located over the letter H. In this way, all elements of the code are marked in non-clear text, in disguised form in the selection part 3. The symbol part is then torn off the selection part and the selection part 3 alone is forwarded.

Of course, it is equally feasible to combine the selection fields and the identification fields in such manner that entries in the selection part are made by ticking or encircling, in each case, the corresponding character in the identification field.

The individual preparation of the form as described in the present embodiment is accomplished that for each number of the code to be selected, ten characters (0 to 9) are printed in the symbol fields of the symbol area, in permuted order. The permutation sequence is created in a suitable EDP installation, using an algorithm in which the variable is the form number marked in the identifier field. The form numbers may be produced by serial numbering and, for instance, calculating as the last digit a check value from the preceding digits. The permutation algorithm should be complex enough to preclude deduction of the relationship between form number and permutation sequence from the printed-out forms. For instance, one may use as part of the permutation algorithm the so called DES algorithm, which presents adequate security level. Since the form number controlling the permutation algorithm individualizes every form, the permutation sequence of the numbers in the selection field will be unique on each form, within the limits provided by the combinations of numbers.

Interpretation, in the payment card issuer's data system, of the data furnished on the order form, that is in the selection part, is accomplished as follows. From each card order form, the form number and the identifications of the ticked selection fields, i.e., the respective letters found in the identifying fields 12, are recorded. The form number is thereafter checked, and with its aid the numerical values corresponding to the indicated selection squares are calculated, using the permutation algorithm. The calculation is performed with an EDP installation meeting the security requirements so that the identification numbers that are formed do not at any stage exist outside the computer in clear text form. The identification number is encrypted and retained, attached to the rest of the card data, in secrecy in the card data base.

It is possible, as an alternative to the permutation sequence based on an algorithm, to use, for instance, a permutation sequence controlled with random numbers, in which case the permutation sequence has to stored in the card issuer's data base.

Thus, while the invention has been described above with respect to a preferred embodiment, the foregoing and other changes in form and detail may be made therein without departing from the spirit and scope of the invention.

What is claimed is:

1. Apparatus for selection of a secret code having at least one symbol comprising:

form means having a symbol part, a selection part, and means for facilitating the separation of said symbol part and selections part, at least, said selection part having an identifier field which individually identifies the form means, said symbol part having a symbol field for each code symbol, each symbol field containing the available code symbols in a permuted sequence which is unique to each form means, and said selection part having a selection field corresponding to each symbol field, each selection field having locations in which locations corresponding to selected locations in the corresponding symbol field may be marked to provide an indication of the selected secret code in non-clear text form.

2. Apparatus according to claim 1, characterized in that the permutation of each symbol field can be calculated from the form identifier using a permutation algorithm.

3. Apparatus according to claim 1, characterized in that the permutation of each symbol field is stored in a data base and can be identified by use of the form identifier field.

4. Apparatus according to claim 1, characterized in that the symbol part includes a code field in which the code selected in the symbol field can be entered in clear text.

5. Apparatus according to claim 1, characterized in that the selection part includes an identification field corresponding to each selection field, for individually identifying the entries made in the selection fields.

6. Apparatus according to claim 1, including means for covering the symbol fields in an unused form means, said means for covering being removable to reveal the form fields when the form means is used.

7. A method for selecting a secret code having at least one character by use of a form having a symbol part and a separatable selection part, the method comprising the steps of:

selecting characters of the code in symbol fields on said symbol part, there being a symbol field for each character of the code, the available code symbols for each character being presented for each field in a permuted sequence which is unique for each form;

marking locations in selection fields corresponding to the selected symbols in the symbol fields, there being a selection field on the selections part corresponding to each symbol field on the symbol part, each selection field having a location corresponding to each permuted available code symbol of the corresponding symbol field;

separating the symbol and selection parts; and utilizing a unique identification field in the selection part and the marked locations in the selection field to record the selected secret code at a secure facility.

8. A method according to claim 7, characterized in that the characters in the symbol fields are printed in a permuted sequence which is individual for each form means, and including the step of using a shuffling algorithm in which the identifier in the identifier field is used for creation of the permuted sequence.

9. A method according to claim 8 including the step of interpreting the information encrypted in the selection part with the permutation algorithm, using for basic data the identifier in the identifier field and the symbols in the identification fields corresponding to the selections made in the selection area.

10. A method according to claim 7, characterized in that the characters in the symbol fields are printed out in permuted sequence, individually on each form, using for creation of the printout material an algorithm controlled with random numbers, the shuffling sequence being stored in the card issuer's data system.

* * * * *